(No Model.)

L. M. GOODALE.

COVER FOR COOKING KETTLES AND UTENSILS.

No. 313,320. Patented Mar. 3, 1885.

WITNESSES:
C. Neveux
C. Sedgwick

INVENTOR:
L. M. Goodale
BY Munn & Co
ATTORNEYS.

UNITED STATES PATENT OFFICE.

LAURA MARIETT GOODALE, OF MARSHALLTOWN, IOWA, ASSIGNOR TO HERSELF AND PETER GORDON, OF SAME PLACE.

COVER FOR COOKING KETTLES AND UTENSILS.

SPECIFICATION forming part of Letters Patent No. 313,320, dated March 3, 1885.

Application filed April 10, 1884. (No model.)

*To all whom it may concern:*

Be it known that I, LAURA M. GOODALE, of Marshalltown, in the county of Marshall and State of Iowa, have invented certain new and useful Improvements in Covers for Cooking Kettles or Utensils, of which the following is a full, clear, and exact description.

This invention consists in a cover for cooking kettles or utensils, provided with an internal strainer and a vent-slide, whereby the contents of the kettle may be drained through its cover while in place on the utensil, and provision is made for the escape of water and steam in draining without exposing the person or hands to contact with either; also for the escape of steam when cooking, to prevent the contents from boiling over.

Reference is to be had to the accompanying drawings, forming part of this specification, in which similar letters of reference indicate corresponding parts in all the figures.

Figure 1:
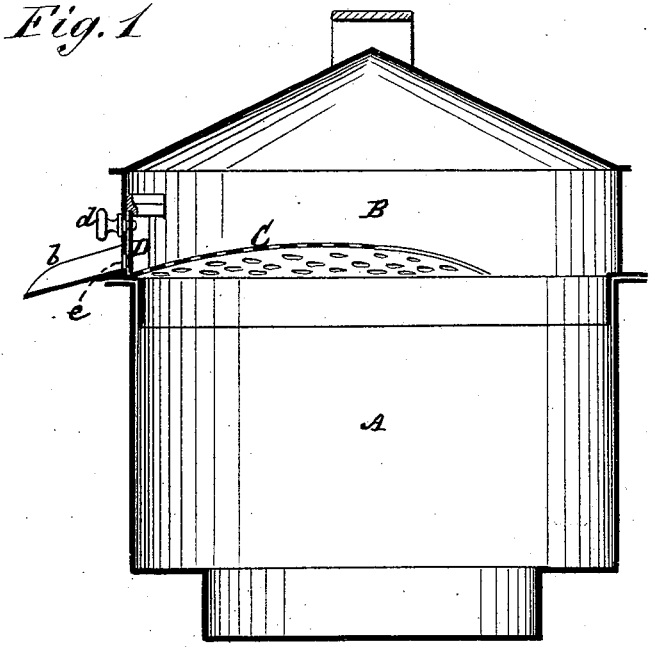
Figure 2:
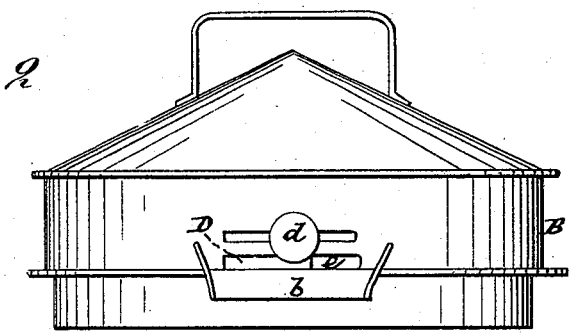
Figure 3:
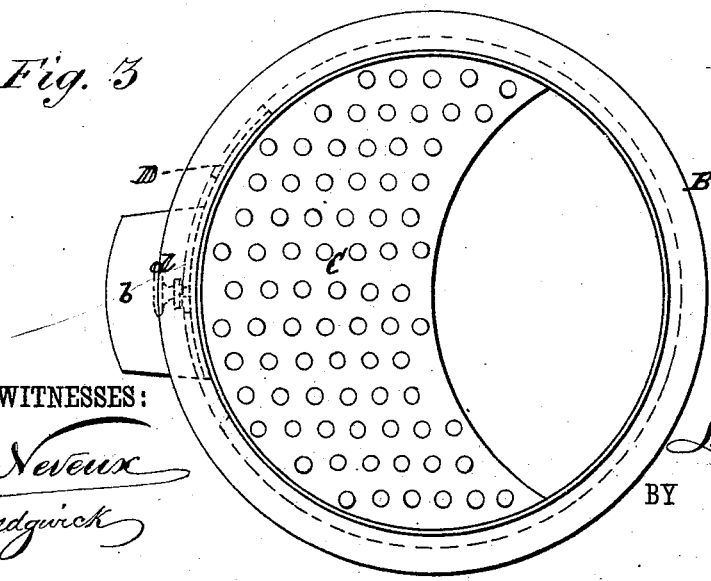

Figure 1 represents a vertical section of a cooking-kettle with my improved cover applied; Fig. 2, a front view of the cover, and Fig. 3 an inverted plan or under side view thereof.

A indicates the body of the kettle, and B its cover.

Within the lower portion of the cover B, and extending for any desired distance from its front, is a strainer or drainer, C, which may either be made of wire-gauze or of perforated sheet metal, and which forms an attachment to or part of the cover.

In the front side of the cover, within range or line of a spout, *b*, projecting therefrom, and situated over the drainer, is a slide, D, controlled by a knob, *d*, from the outside, and serving to uncover or close, as required, one or more outlets, *e*, in the cover over the spout.

By means of this combined cover and drainer the contents of the kettle may be drained through the cover while on the utensil by suitably inclining the kettle to run off the water through the drainer and spout *b*, or outlet *e* communicating therewith, the slide D being properly adjusted for the purpose. Said slide, too, allows the water and steam to escape without coming in contact with the hands or person, and may be more or less opened when the kettle is on the fire to allow steam to escape, and so prevent the contents of the kettle from boiling over. By this construction, also, a steaming-chamber is formed between the strainer and the top of the cover, in which articles to be steamed may be placed.

A kitchen utensil of this description will be found exceedingly convenient and useful, and as the improvement is in the cover it may readily be applied to kettle-bodies of ordinary construction.

The cover, it should be observed, is practically a close one, the strainer or drainer in no way interfering with it in that respect, so that any culinary operation which requires the kettle to be kept closed may be carried on in the kettle, just as if there were no drainer.

Having thus fully described my invention, I claim as new and desire to secure by Letters Patent—

1. A cover for cooking utensils provided with a strainer in its lower portion, forming a steaming-chamber between it and the top of the cover, and having combined with it a slide for closing one or more outlets, substantially as herein shown and described.

2. A cover for cooking kettles or utensils, having combined with it an internal strainer or drainer for draining the contents of the kettle through the cover while on the utensil, and forming a steaming-chamber between it and the top of the cover, and having provision for escape of the drained water, or steam and water, from the cover above the drainer, substantially as specified.

3. The kettle-cover B, provided with a drainer, C, extending any desired distance backward in its lower portion or front part of its base, and constructed or provided with one or more outlets, *e*, over the drainer in the front side of the cover, and with a slide, D, controlling the same, essentially as and for the purposes herein set forth.

4. The combination of the spout *b* with the cover B, having an outlet-aperture, *e*, in it over the spout, the slide D, controlling said outlet, and the internal strainer or drainer, C, the whole forming a combined kettle-cover and drainer, substantially as specified.

LAURA MARIETT GOODALE.

Witnesses:
PETER GORDON,
G. W. BEASLEY.